(12) United States Patent
Tsukamoto et al.

(10) Patent No.: US 12,170,471 B2
(45) Date of Patent: Dec. 17, 2024

(54) DEVICE FOR ATTACHING MOTOR PROTECTOR AND ENCAPSULATED-TYPE ELECTRIC COMPRESSOR

(71) Applicant: UBUKATA INDUSTRIES CO., LTD., Nagoya (JP)

(72) Inventors: Tomoki Tsukamoto, Nagoya (JP); Takashi Adake, Nagoya (JP); Tatsuya Ino, Nagoya (JP)

(73) Assignee: UBUKATA INDUSTRIES CO., LTD., Nagoya (JP)

(*) Notice: Subject to any disclaimer, the term of this patent is extended or adjusted under 35 U.S.C. 154(b) by 0 days.

(21) Appl. No.: 18/701,730

(22) PCT Filed: Nov. 12, 2021

(86) PCT No.: PCT/JP2021/041729
§ 371 (c)(1),
(2) Date: Apr. 16, 2024

(87) PCT Pub. No.: WO2023/084736
PCT Pub. Date: May 19, 2023

(65) Prior Publication Data
US 2024/0356403 A1 Oct. 24, 2024

(51) Int. Cl.
*H02K 5/08* (2006.01)
*H02K 5/22* (2006.01)

(52) U.S. Cl.
CPC .............. *H02K 5/08* (2013.01); *H02K 5/22* (2013.01)

(58) Field of Classification Search
CPC .................................. H02K 5/08; H02K 5/22
See application file for complete search history.

(56) References Cited

U.S. PATENT DOCUMENTS 4,926,081 A * 5/1990 DiFlora ............... H01R 4/2462
310/71
5,515,217 A * 5/1996 Higashikata ....... H01H 37/5436
361/25

(Continued)

FOREIGN PATENT DOCUMENTS

CN 105298818 A 2/2016
JP S62296739 A 12/1987

(Continued)

OTHER PUBLICATIONS

Japanese Search Translated (Year: 2022).*
International Search Report dated Feb. 8, 2022, for International Patent Application No. PCT/JP2021/041729.

*Primary Examiner* — Brian Christopher Delrue
(74) *Attorney, Agent, or Firm* — KARCESKI IP LAW, PLLC

(57) ABSTRACT

A device for attaching a motor protector includes: an accommodating member; and a fixation member to which the accommodating member accommodating a motor protector is detachably attached. The fixation member includes a base portion and at least two arm portions. The two arm portions sandwich and hold the accommodating member once the accommodating member is pushed to inside of the two arm portions. The fixation member further includes assisting portions that extend from the base portion to a side of the accommodating member, are caused to pass through assisting portion insertion holes provided in the accommodating member and stick out inside the accommodating member and at positions where the assisting portions sandwich the accommodating member with the arm portions, and cause an elastic force to act on the accommodating member in a case where the accommodating member moves in a direction that is parallel to the base portion.

9 Claims, 11 Drawing Sheets

(56) References Cited

U.S. PATENT DOCUMENTS

| | | | | |
|---|---|---|---|---|
| 6,755,631 | B2* | 6/2004 | Kawashima | H01R 13/5213 |
| | | | | 417/313 |
| 7,622,835 | B2* | 11/2009 | Kimball | H01R 33/06 |
| | | | | 310/71 |
| 2002/0047382 | A1* | 4/2002 | Gutris | H02K 5/15 |
| | | | | 310/89 |
| 2004/0027790 | A1* | 2/2004 | Seo | H02B 1/06 |
| | | | | 361/600 |
| 2008/0179974 | A1* | 7/2008 | Kimball | H01R 33/06 |
| | | | | 310/91 |
| 2014/0246959 | A1* | 9/2014 | Kimata | H02K 11/05 |
| | | | | 310/68 D |
| 2014/0265683 | A1* | 9/2014 | Hossain | H02K 1/185 |
| | | | | 310/89 |
| 2014/0292128 | A1* | 10/2014 | Yokoe | H02K 3/525 |
| | | | | 310/89 |
| 2015/0275894 | A1* | 10/2015 | Tabata | F04C 18/3446 |
| | | | | 417/410.3 |
| 2017/0302127 | A1* | 10/2017 | Sakuragi | H02K 11/33 |
| 2019/0052132 | A1* | 2/2019 | Ranalli | H02K 3/522 |

FOREIGN PATENT DOCUMENTS

| | | | |
|---|---|---|---|
| JP | H08163830 | A | 6/1996 |
| JP | 2005291154 | A | 10/2005 |
| JP | 2006161707 | A  * | 6/2006 |

* cited by examiner

DEVICE FOR ATTACHING MOTOR PROTECTOR AND ENCAPSULATED-TYPE ELECTRIC COMPRESSOR

CROSS-REFERENCE TO RELATED APPLICATION(S)

This is a National Stage Entry into the United States Patent and Trademark Office from International Patent Application No. PCT/JP2021/041729 filed on Nov. 12, 2021, the entire contents of which are incorporated herein by reference.

FIELD OF THE INVENTION

An embodiment of the present invention relates to a device for attaching a motor protector and an encapsulated-type electric compressor.

BACKGROUND OF THE INVENTION

For example, a motor protector for protecting a motor from burning due to an abnormal current may be attached to a motor incorporated in an encapsulated-type electric compressor, particularly, a three-phase motor. Such a type of motor protector is connected to a neutral point of a three-phase star connection inside the encapsulated-type electric compressor. Also, the motor protector includes a heat response plate that operates in response to an atmosphere temperature inside the compressor or heat generation due to a current flowing through the motor protector, and a circuit is opened by an operation of the heat response plate to shut down power distribution to all windings, that is, power lines of the motor.

In the related art, such a motor protector is attached by covering the motor protector with a sleeve made of an insulating resin and tying it to a motor winding. However, such an attachment work is complicated, and work efficiency is low. Also, since the motor protector is covered with the sleeve in such an attachment method, efficiency of a refrigerant in cooling the motor protector is low, and the temperature of the motor protector is likely to rise even with a heat caused by an ordinary operation current. Although it is thus necessary to set the operation temperature of the heat response plate to be higher than an upper limit temperature of the motor, responsiveness to an abnormal current at the time of a low-temperature start is then degraded.

Thus, a method of accommodating the motor protector in a case made of a resin and partially opened and attaching the case to a metal fitting welded to a compressor container, for example, through so-called snap fitting has been considered. According to this, the periphery of the motor protector is not entirely covered with the sleeve, and it is thus possible to improve efficiency in cooling the motor protector and to improve workability through attachment using snap fitting.

However, in the case of the aforementioned attachment method, an increase in size and weight of the motor protector leads to an increase in influence of vibration of the motor, and as a result, the motor protector itself and the case accommodating the motor protector are likely to considerably shake. Then, the case and the motor protector become likely to fall off, and the likelihood that a connection line pulled with shaking is damaged due to friction increases. Therefore, the aforementioned attachment method using the metal fitting and the case is limited to an application to a relatively small and light-weighted motor protector in the related art.

SUMMARY OF THE INVENTION

The present embodiment has been made in view of the above-mentioned circumstances, and an object thereof is to provide a device for attaching a motor protector that improves responsiveness of the motor protector, improves attachment workability, and is less affected by vibration and the like even if the motor protector is relatively large and heavy, and an encapsulated-type electric compressor including the attachment device.

A device for attaching a motor protector according to an embodiment is an attachment device for attaching a heat response-type motor protector for protecting a motor incorporated in an encapsulated-type electric compressor to a compressor container of the encapsulated-type electric compressor. The device for attaching a motor protector includes: an accommodating member that is configured of a material with an electrical insulating property and is able to accommodate the motor protector in a state where a part of a periphery of the motor protector is opened; and a fixation member that is fixed to an inner surface of the compressor container and is able to fix the accommodating member to the inner surface of the compressor container with the accommodating member accommodating the motor protector detachably attached to the fixation member. The fixation member includes a base portion that is formed into a plate shape facing the inner surface of the compressor container, and at least two arm portions that are provided at positions where the arm portions sandwich the accommodating member on both outer sides, and extend from the base portion to a side of the accommodating member. The two arm portions are configured such that once the accommodating member is pushed to inside of the two arm portions, at least one of the two arm portions is elastically opened in a direction away from the other to receive the accommodating member, and once the accommodating member is pushed to a predetermined position, the two arm portions are able to sandwich and hold the accommodating member between the two arm portions with a restoring force of the elastically opened arm portion. The fixation member further includes assisting portions that extend from the base portion to the side of the accommodating member, are caused to pass through assisting portion insertion holes provided in the accommodating member and stick out inside the accommodating member and at positions where the assisting portions sandwich the accommodating member with the arm portions in a case where the accommodating member is attached to the fixation member, and cause an elastic force to act on the accommodating member to restrict movement of the accommodating member in a case where the accommodating member moves in a direction that is parallel to the base portion.

Also, an encapsulated-type electric compressor according to an embodiment includes: a compressor container that has air tightness; a compression mechanism that is provided inside the compressor container and compresses and ejects a refrigerant; a motor that is provided inside the compressor container and drives the compression mechanism; a motor protector that is provided inside the compressor container and is connected to a power line of the motor; and the aforementioned device for attaching a motor protector that attaches the motor protector to an inner surface of the compressor container.

DESCRIPTION OF EMBODIMENT(S) OF THE INVENTION

Figure 11:
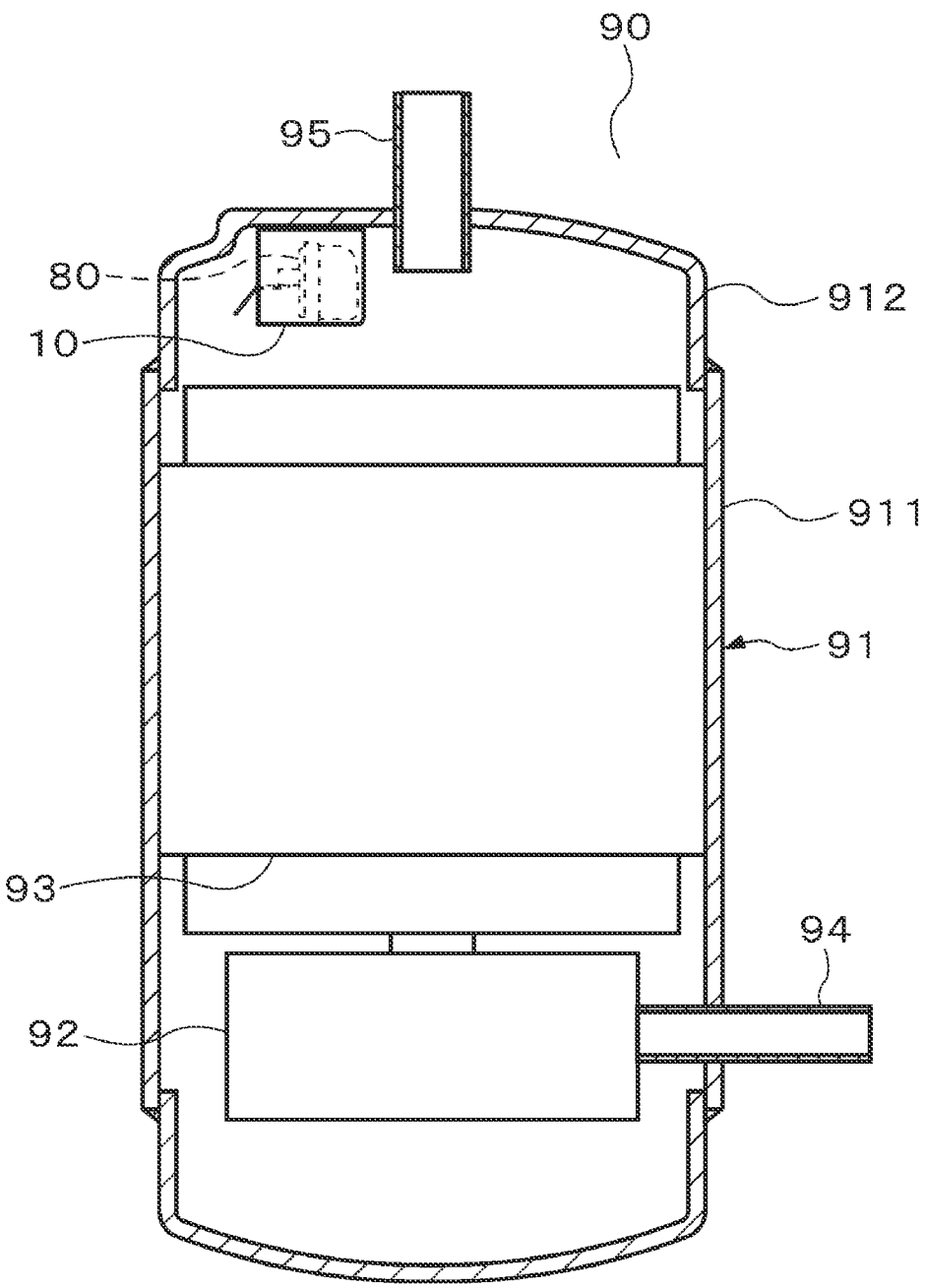
FIG. 11 is a sectional view illustrating an example of an overview configuration of an encapsulated-type electric compressor with the device for attaching a motor protector according to the embodiment attached thereto.

Hereinafter, an embodiment of a device for attaching a motor protector and an encapsulated-type electric compressor to which the attachment device is applied will be described with reference to the drawings. An attachment device 10 illustrated in FIG. 1 and the like is for attaching a motor protector 80 to an inner surface of a compressor container 91 of an encapsulated-type electric compressor 90 as illustrated in FIG. 11, for example. The motor protector 80 illustrated in FIG. 11 and the like is a heat response-type motor protector for protecting a motor 93 incorporated in the encapsulated-type electric compressor 90, for example. The motor protector 80 is suitable for a motor incorporated in an encapsulated-type electric compressor used for an air conditioner, for example, particularly, a three-phase motor. The motor protector 80 is used by being connected to a neutral point of the three-phase motor, for example.

The motor protector 80 generates heat by a predetermined abnormal current flowing through the motor protector 80, or the motor 93 itself generates heat due to some abnormality, and as a result, the motor protector 80 operates and opens a circuit in a case where a peripheral atmosphere temperature rises to a predetermined temperature. The motor protector 80 thus has a function of disconnecting the neutral point of the motor 93 and shutting down power supply to all windings, that is, power lines of the motor 93.

The motor protector 80 is attached to the inner surface of the compressor container 91 using the attachment device 10. The attachment device 10 includes tab terminals 11, 12, and 13, an accommodating member 20, and a fixation member 30 as illustrated in FIGS. 1 to 4. In the case of the present embodiment, the attachment device 10 includes the three tab terminals 11, 12, and 13.

The tab terminals 11, 12, and 13 are formed by folding plate members made of metal. Two tab terminals 11 and 12 out of the three tab terminals 11, 12, and 13 are fixed to the accommodating member 20 in a state where the tab terminals 11 and 12 penetrate through the accommodating member 20, and parts inserted into the accommodating member 20 are welded to a terminal of the motor protector 80. Also, the remaining one tab terminal 13 is not fixed to the accommodating member 20 and is welded to an outside of a bottom surface of the motor protector 80. Moreover, each of the tab terminals 11, 12, and 13 is connected to a neutral point of a motor winding, that is, a power line. In this case, the motor protector 80 is fixed to the accommodating member 20 via the tab terminals 11 and 12.

The accommodating member 20 is configured of a material with an electrical insulating property and is configured to be able to accommodate the motor protector 80 in a state where a part of a periphery of the motor protector 80 is opened. The accommodating member 20 is formed into a container shape capable of accommodating the motor protector 80, for example. The accommodating member 20 can be configured of a resin material with an electrical insulating property and thermal resistance which is called engineering plastic, for example. The accommodating member 20 is formed into a box shape with some of surfaces of a hexahedron removed as a whole.

In the case of the present embodiment, the accommodating member 20 is formed into a shape with two adjacent rectangular surfaces of a rectangular parallelepiped shape removed, that is, a shape having four wall portions 21, 22, 23, and 24, for example. In the present embodiment, the four wall portions 21, 22, 23, and 24 may be referred to as a first wall portion 21, a second wall portion 22, a third wall portion 23, and a fourth wall portion 24, respectively. In this case, the shape of the accommodating member 20 projected to the inner surface of the compressor container 91, that is, the shape in a plan view is a rectangular shape.

Figure 1:
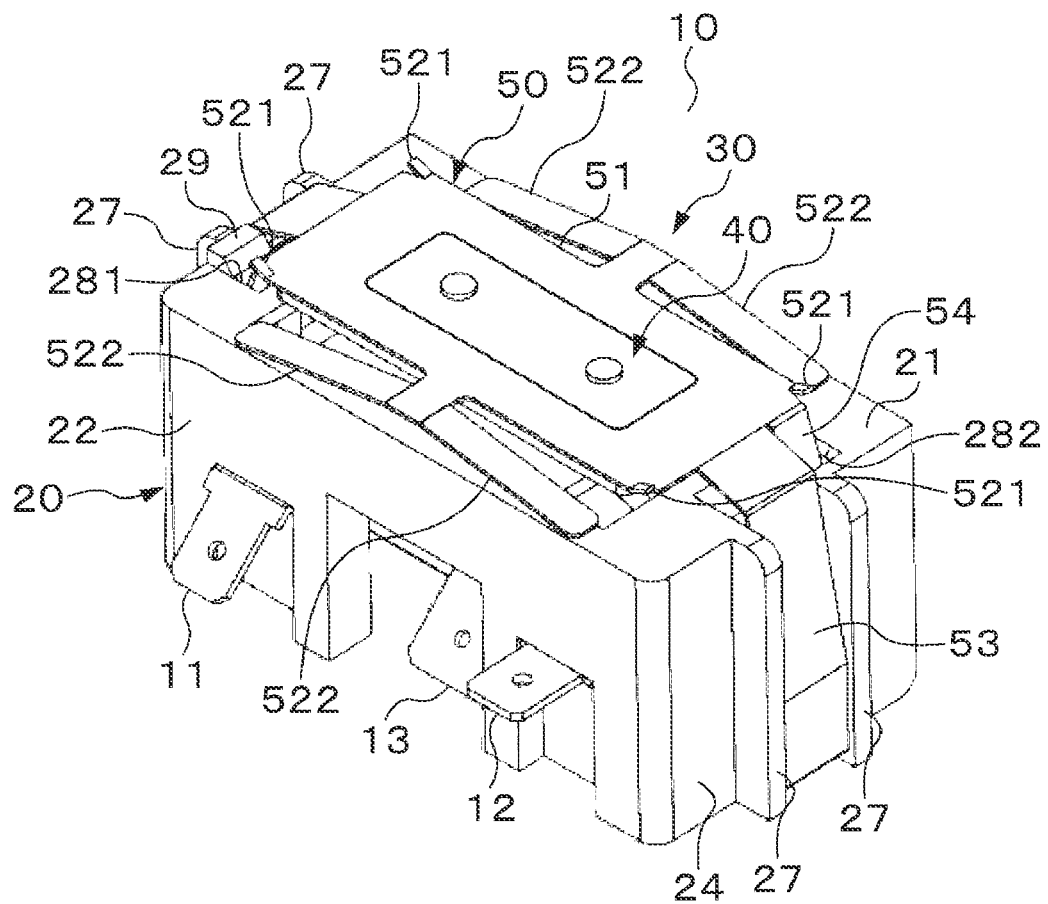
FIG. 1 is a perspective view illustrating a device for attaching a motor protector according to an embodiment.

The first wall portion 21 is a wall portion extending in a longitudinal direction of the accommodating member 20 and facing the inner surface of the compressor container 91 in the case of attachment to the compressor container 91. In this case, the first wall portion 21 constitutes a bottom surface or a top surface of the accommodating member 20. The second wall portion 22 is a wall portion extending in the longitudinal direction of the accommodating member 20 and intersecting the first wall portion 21 at a right angle as illustrated in FIG. 1 and the like. In this case, the second wall portion 22 constitutes a side surface of the accommodating member 20 extending in the longitudinal direction. Moreover, each of the third wall portion 23 and the fourth wall portion 24 is a wall portion intersecting both the first wall portion 21 and the second wall portion 22 at a right angle. In this case, the third wall portion 23 and the fourth wall portion 24 constitute side surfaces located at both ends of the accommodating member 20 in the longitudinal direction and face each other.

The fixation member 30 is fixed to the inner surface of the compressor container 91 through welding, for example, and has a function of detachably fixing the accommodating member 20 to the inner surface of the compressor container 91 with the accommodating member 20 accommodating the motor protector 80 detachably attached to the fixation member 30. The fixation member 30 can be configured to have a pressing member 40 and a main body member 50. The pressing member 40 and the main body member 50 can be configured of metal fittings made of metal, for example. In this case, the pressing member 40 and the main body member 50 can be configured of different types of metal as separated elements. For example, the pressing member 40 can be configured of a steel plate, while the main body member 50 can be configured of a thin spring member made of stainless steel. Alternatively, the pressing member 40 and the main body member 50 can be configured of the same type of metal as separated elements or can be integrally configured of the same type of metal.

The pressing member 40 is configured of a plate-shaped member made of metal, for example. The pressing member 40 is fixed to the inner surface of the compressor container 91 through welding or the like in a state where the main body member 50 is sandwiched between the pressing member 40 itself and the inner surface of the compressor container 91. In this manner, the pressing member 40 fixes the main body member 50 to the inner surface of the compressor container 91 while pressing the main body member 50 against the inner surface.

The main body member 50 can be configured of a plate-shaped member made of metal, such as a plate spring, for example. The main body member 50 includes a base portion 51, first elastic portions 521, second elastic portions 522, at least two arm portions 53, and at least two assisting portions 54. The base portion 51, the first elastic portions 521, the second elastic portions 522, the arm portions 53, and the assisting portions 54 are integrally configured by punching and folding a stainless steel plate, for example.

The base portion 51 is a part formed into a rectangular plate shape and facing the inner surface of the compressor container 91 in a case of attachment to the inner surface of the compressor container 91 with the pressing member 40. The base portion 51 includes an opening portion 511. The opening portion 511 is formed to penetrate through the center part of the base portion 51 in a rectangular shape. The pressing member 40 comes into contact with the inner surface of the compressor container 91 through the opening portion 511.

Figure 2:
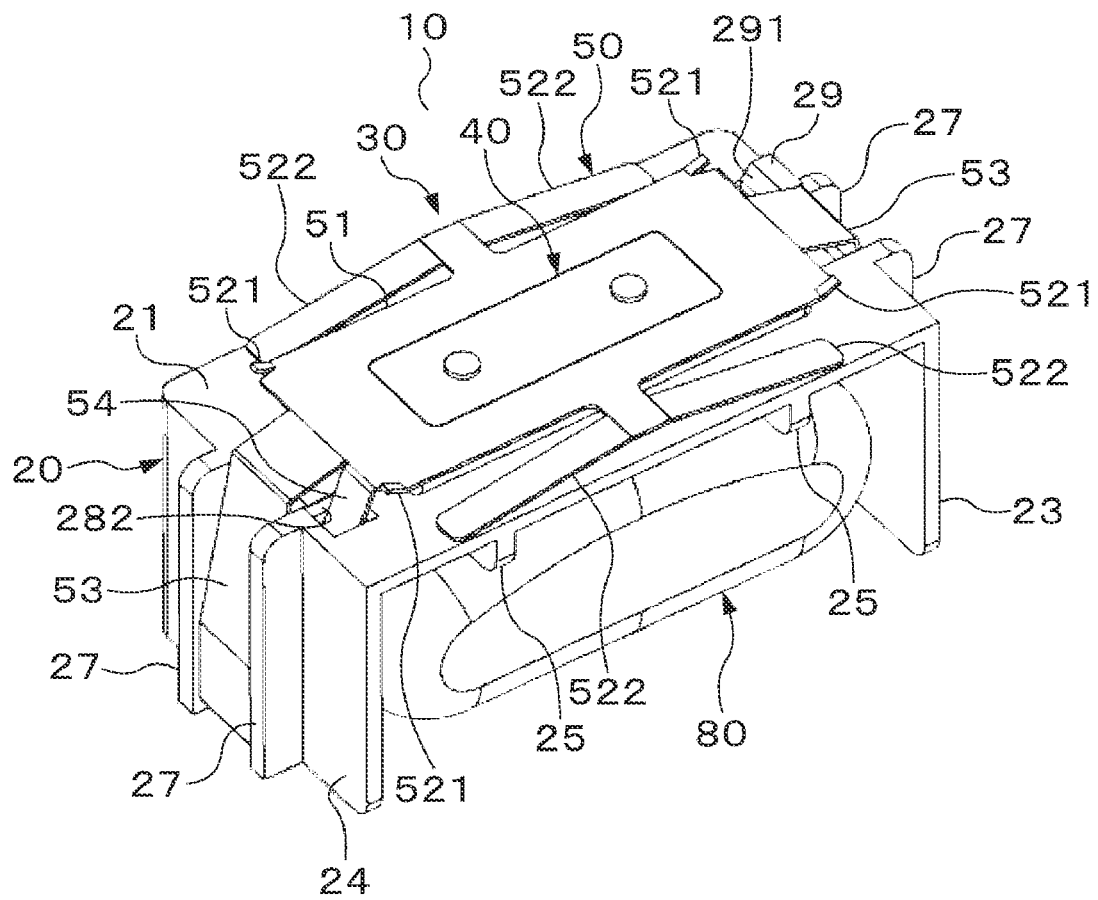
FIG. 2 is a perspective view illustrating the device for attaching a motor protector according to the embodiment from another direction.
Figure 9:
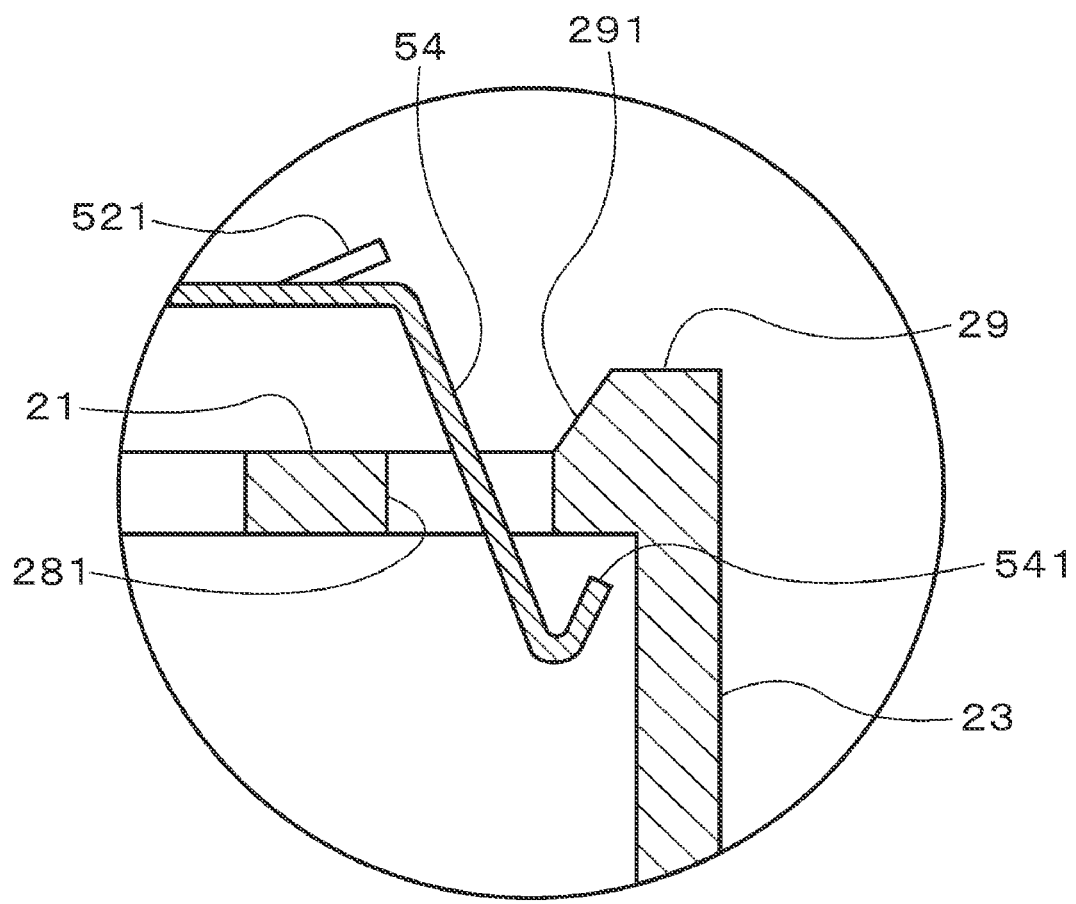
FIG. 9 is an enlarged view of the part X9 in FIG. 8 in regard to the device for attaching a motor protector according to the embodiment.
Figure 10:
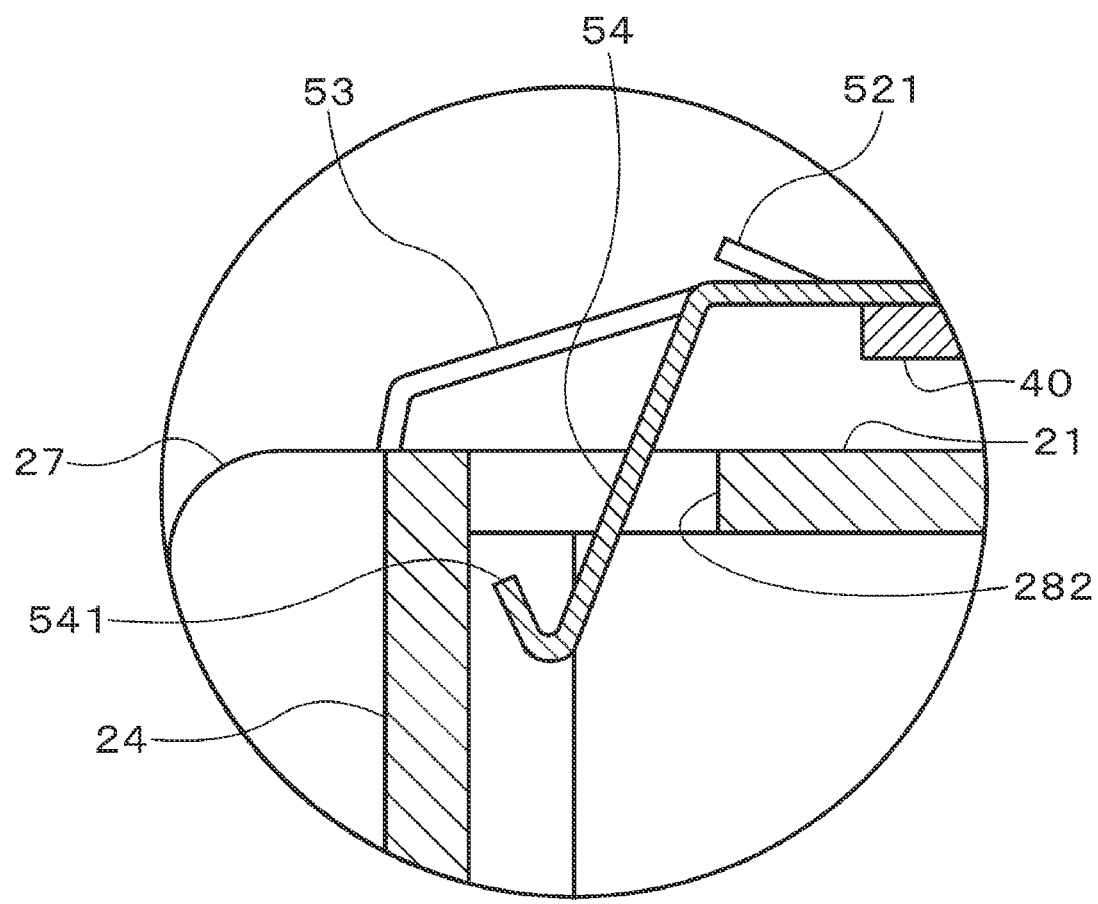
FIG. 10 is an enlarged view of the part X10 in FIG. 8 in regard to the device for attaching a motor protector according to the embodiment.

The first elastic portions 521 are parts of the main body member 50 that come into contact with the inner surface of the compressor container 91. The first elastic portions 521 come into contact with the inner surface of the compressor container 91 and cause an elastic force to act on the base portion 51 in a direction away from the inner surface of the compressor container 91 as illustrated in FIGS. 9, 10, and the like. In this manner, the entire base portion 51 comes into contact with the pressing member 40, and the relative position of the main body member 50 with respect to the pressing member 40 becomes less likely to change. In the case of the embodiment, the main body member 50 includes four first elastic portions 521 as illustrated in FIGS. 1, 2, and the like. Each first elastic portion 521 is formed by folding a small rectangular piece formed at each of four corner parts of the base portion 51 toward the side of the inner surface of the compressor container 91.

Figure 7:
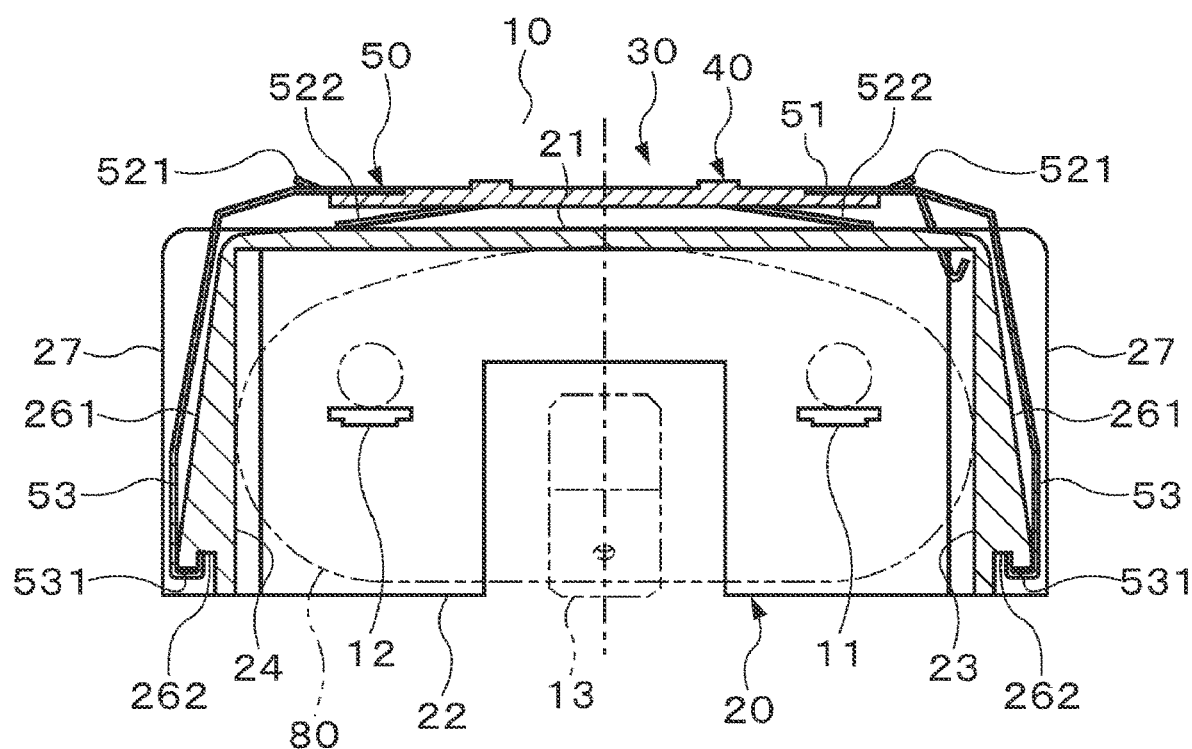
FIG. 7 is a sectional view of the device for attaching a motor protector according to the embodiment taken along the line X7-X7 in FIG. 6.
Figure 8:
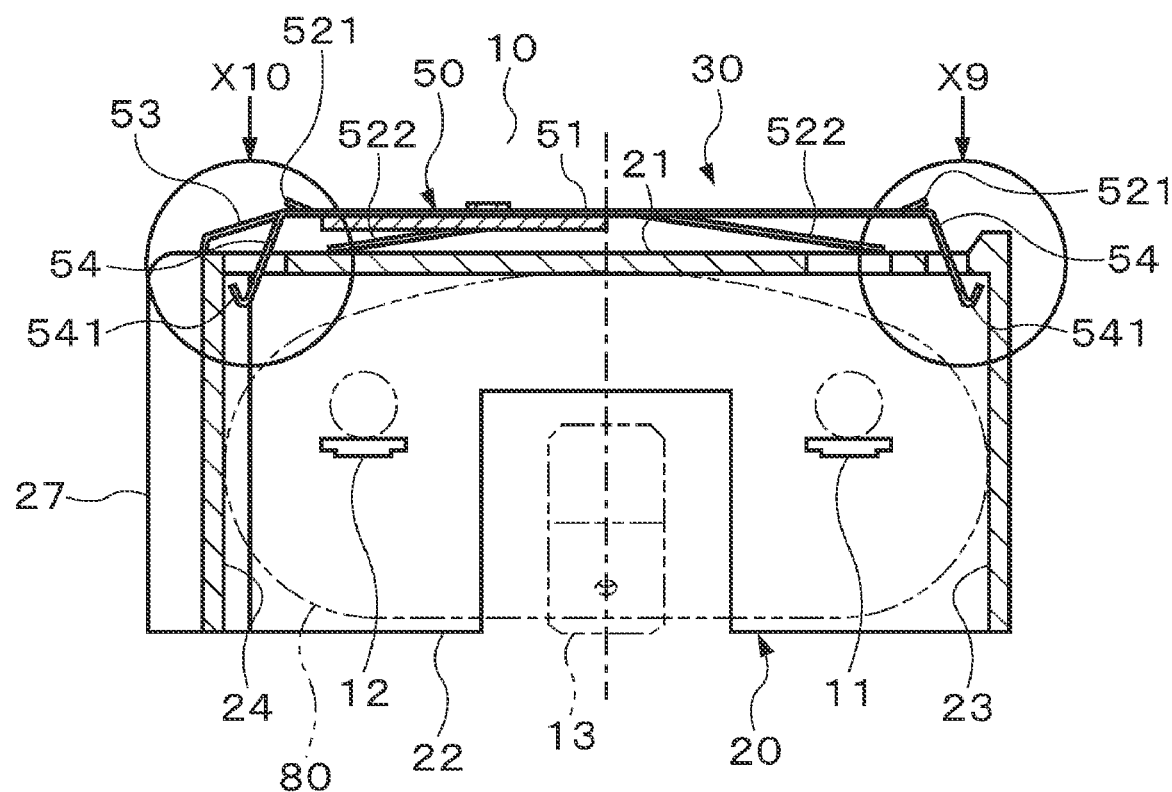
FIG. 8 is a sectional view of the device for attaching a motor protector according to the embodiment taken along the line X8-X8 in FIG. 6.

The second elastic portions 522 are parts of the main body member 50 that come into contact with the accommodating member 20. The second elastic portions 522 come into contact with the first wall portion 21 of the accommodating member 20 and cause an elastic force to act on the accommodating member 20 in a direction away from the base portion 51 as illustrated in FIGS. 7, 8, and the like. In this manner, the second elastic portions 522 can strongly hold the accommodating member 20 with the accommodating member 20 sandwiched between the second elastic portions 522 themselves and arm portion locking portions 531, which will be described later. In the case of the present embodiment, the main body member 50 includes four second elastic portions 522 as illustrated in FIGS. 1, 2, and the like. Each second elastic portion 522 is located outside each side portion of the base portion 51 in the longitudinal direction and is formed into a rectangular shape extending along each long side of the base portion 51. Moreover, each second elastic portion 522 is formed to be bent toward the side of the accommodating member 20 with the center of the base portion 51 in the longitudinal direction located at a center of the folding.

The main body member 50 includes, for example, two arm portions 53. The two arm portions 53 are provided at positions sandwiching the accommodating member 20 on both outer sides and extend from the base portion 51 to the side of the accommodating member 20, respectively. In the case of the present embodiment, the two arm portions 53 are formed by folding elongated parts provided at both ends of the base portion 51 in the longitudinal direction with respect to the base portion 51, respectively. Also, the centers of the arm portions 53 in the width direction coincide with the center of the base portion 51 in the width direction. In this case, the two arm portions 53 face each other with the base portion 51 sandwiched therebetween.

The two arm portions 53 are configured such that at least one of the two arm portions 53 is elastically opened in a direction away from the other arm portion 53 and the accommodating member 20 can be received therebetween once the accommodating member 20 is pushed to the inside of the two arm portions 53. Also, the two arm portions 53 are configured to be able to sandwich and hold the accommodating member 20 between the two arm portions 53 with a restoring force of the elastically opened arm portion 53 once the accommodating member 20 is pushed to a predetermined position.

In the case of the present embodiment, each of the two arm portions 53 is configured to be elastically swingable using a boundary part from the base portion 51 as a support point in a case where each arm portion 53 receives a force in the longitudinal direction of the base portion 51. Here, the distance between the two arm portions 53 is set to be slightly longer than the outer shape dimension of the accommodating member 20 in the longitudinal direction in a region other than distal end parts of the arm portions 53 and is set to be slightly shorter than the outer shape dimension of the accommodating member 20 in the longitudinal direction at the distal end parts of the arm portions 53. Therefore, once the accommodating member 20 is pushed to the inside of the two arm portions 53, the two arm portions 53 elastically open in the direction away from each other and receive the accommodating member 20. Then, once the accommodating member 20 is pushed to the predetermined position, the two arm portions 53 sandwich and hold the accommodating member 20 with the distal end parts of the two arm portions 53 using the restoring force of the two elastically opened arm portions 53.

Figure 3:
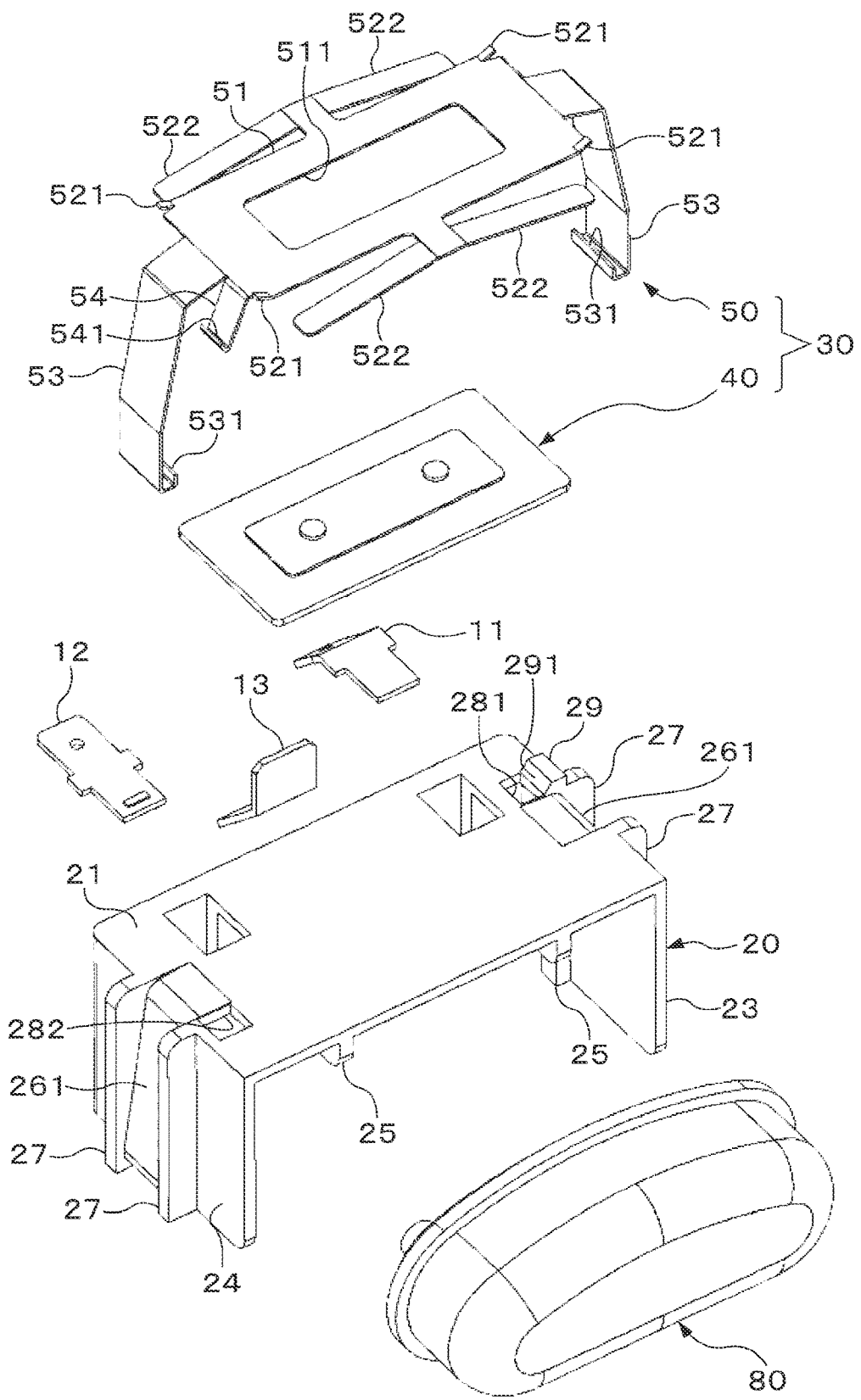
FIG. 3 is an exploded view of the device for attaching a motor protector according to the embodiment.
Figure 4:
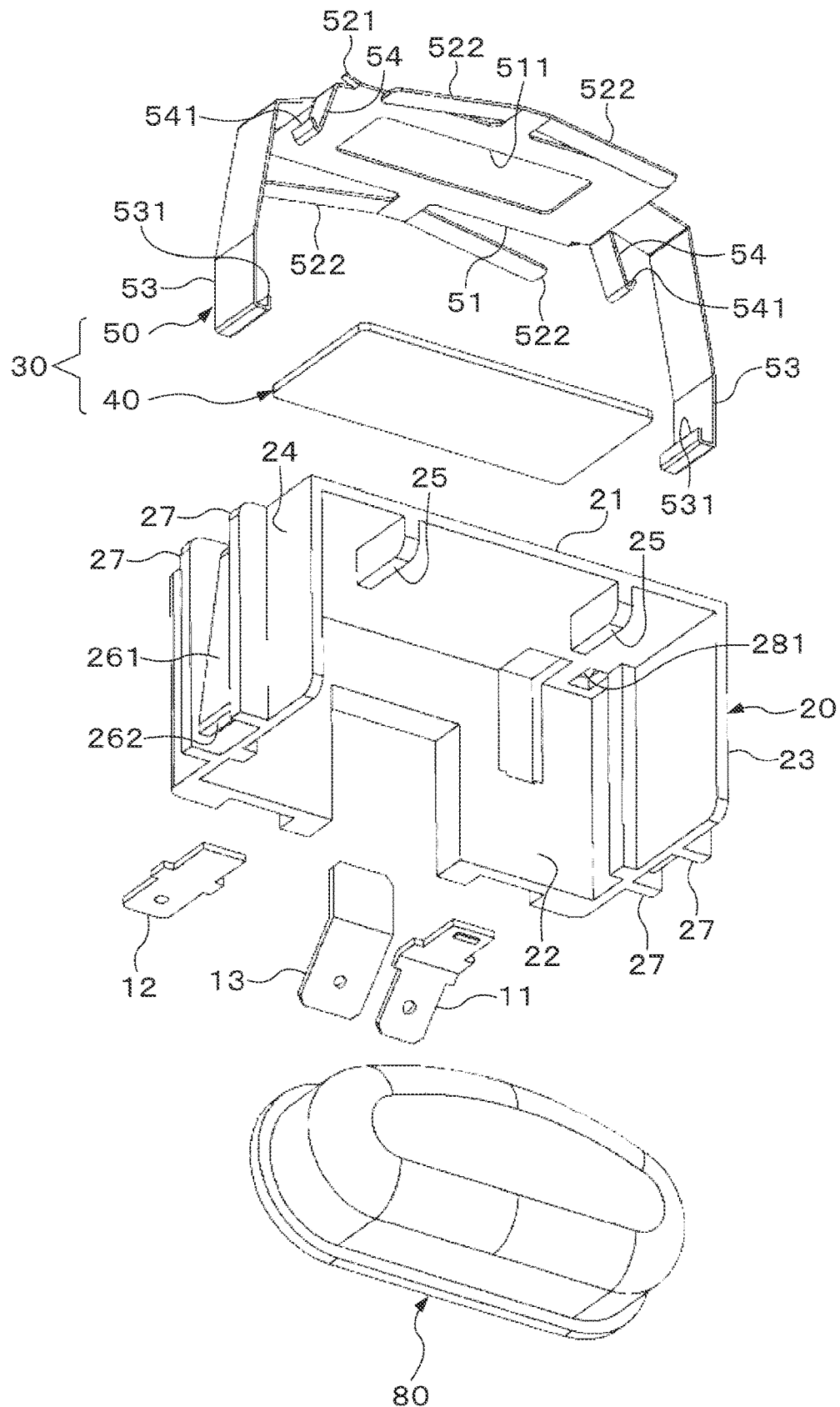
FIG. 4 is an exploded perspective view of the device for attaching a motor protector according to the embodiment from another direction.

Also, each arm portion 53 includes an arm portion locking portion 531 as illustrated in FIGS. 3, 4, and the like. The arm portion locking portion 531 has a function of curbing falling-off of the accommodating member 20 from between the arm portions 53 by locking the accommodating member 20 in a state where the accommodating member 20 is sandwiched between the two arm portions 53. In other words, the arm portions 53 including the arm portion locking portions 531 have a function of locking and holding the accommodating member 20 through so-called snap fitting using elasticity of the arm portions 53. The arm portion locking portions 531 can be formed by folding back the distal end parts of the arm portions 53 toward an inner side, that is, toward the side of the other arm portion 53 in a U shape as illustrated in FIG. 7.

The main body member 50 includes two assisting portions 54, for example, as illustrated in FIGS. 3 and 4. Each of the two assisting portions 54 extends from the base portion 51 to the side of the accommodating member 20. The total length of the assisting portions 54 is shorter than the total length of the arm portions 53. The assisting portions 54 are caused to pass through assisting portion insertion holes 281 and 282 provided in the accommodating member 20 as will be described later, respectively, and stick out at positions inside the accommodating member 20 where the assisting portions 54 sandwich the accommodating member 20 with the arm portions 53 in a case where the accommodating member 20 is attached to the main body member 50 of the fixation member 30. In this state, each assisting portion 54 exhibits a function of causing an elastic force to act on the accommodating member 20 and restricting movement of the accommodating member 20 in a case where the accommodating member 20 moves in a direction that is parallel to the longitudinal direction of the base portion 51.

In the case of the present embodiment, the two assisting portions 54 are formed by bending small, elongated pieces provided at both end portions of the base portion 51 in the longitudinal direction with respect to the base portion 51, respectively. The length dimension and the width dimension of the assisting portions 54 are smaller than the length dimension and the width dimension of the arm portions 53. The assisting portions 54 can be provided between the first elastic portions 521 and the arm portions 53 on the short sides of the base portion 51, for example.

Figure 5:
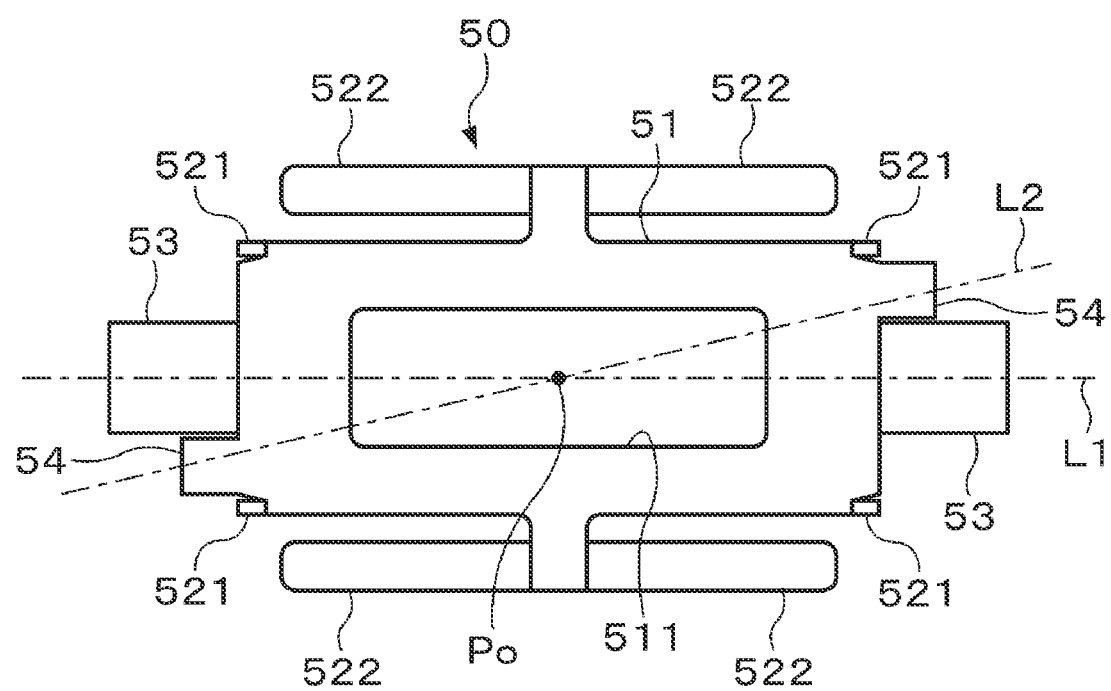
FIG. 5 is a plan view illustrating a main body member constituting a fixation member in regard to the device for attaching a motor protector according to the embodiment.

Here, the line virtually connecting the two arm portions 53 and 53 is defined as a first virtual line L1, and the line virtually connecting the two assisting portions 54 and 54 is defined as a second virtual line L2 in a plan view as illustrated in FIG. 5. In this case, each of the two arm portions 53 and 53 and the two assisting portions 54 and 54 is provided at a position where the first virtual line L1 and the second virtual line L2 intersect in a plane of the base portion 51. In other words, the two assisting portions 54 and 54 are provided at diagonal positions of the base portion 51 with the first virtual line L1 sandwiched therebetween. In this case, the first virtual line L1 and the second virtual line L2 intersect near the center of the base portion 51 in a plan view. In other words, an intersection Po of the first virtual line L1 and the second virtual line L2 is located near the center of the base portion 51, in this case, near the center of the opening portion 511. Also, the two arm portions 53 and 53 and the two assisting portions 54 and 54 are point-symmetrically disposed around the intersection Po of the first virtual line L1 and the second virtual line L2 in a plan view.

Also, in a case where the accommodating member 20 is in a stationary state, that is, in a case where the accommodating member 20 is not swinging, each assisting portion 54 does not cause an elastic force to act on the accommodating member 20. Specifically, in the case where the accommodating member 20 is in a stationary state, each assisting portion 54 is not in contact with the accommodating member 20 as illustrated in FIGS. 9 and 10. If the accommodating member 20 swings in response to vibration or the like of the motor 93, for example, then the accommodating member 20 comes into contact with each assisting portion 54 and receives an elastic force from each assisting portion 54, and the swinging of the accommodating member 20 is thereby restricted.

Also, each assisting portion 54 includes an assisting portion locking portion 541 as illustrated in FIGS. 9, 10, and the like. The assisting portion locking portion 541 is provided at a distal end part of the assisting portion 54. Moreover, the assisting portion locking portion 541 has a function of restricting movement of the accommodating member 20 in a direction away from the fixation member 30 by locking around the assisting portion insertion hole 281 in a state where the assisting portion 54 is caused to pass through the assisting portion insertion hole 281 as illustrated in FIG. 9, for example. The assisting portion locking portion 541 can be formed by folding back the distal end part of the assisting portion 54 toward the outer side, that is, the side opposite to the other assisting portion 54 in a U shape, for example, as illustrated in FIGS. 9, and 10.

Figure 6:
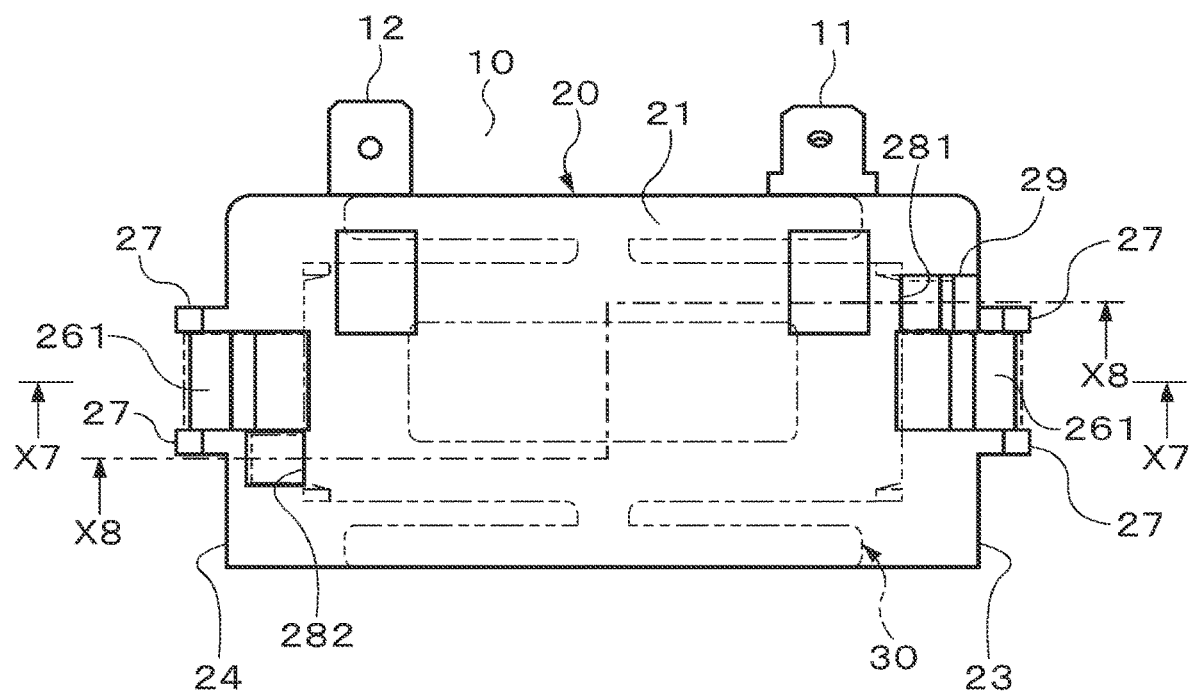
FIG. 6 is a plan view illustrating the device for attaching a motor protector according to the embodiment, in which the fixation member is illustrated by a two-dotted dash line.

The accommodating member 20 includes a support portion 25, receiving portions 261, arm portion locked portions 262, restricting portions 27, assisting portion insertion holes 281 and 282, and a guiding portion 29 as illustrated in FIGS. 3, 4, 6, and the like. The support portion 25 is provided on the side of the inner surface of the first wall portion 21 and supports the motor protector 80 installed inside the accommodating member 20. In this manner, the motor protector 80 is maintained in a state where the motor protector 80 is separated from the inner surface of the first wall portion 21.

The receiving portions 261 and the arm portion locked portions 262 are provided to correspond to the arm portions 53 of the main body member 50. In the case of the present embodiment, the accommodating member 20 includes two receiving portions 261 and two arm portion locked portions 262. Each receiving portion 261 is formed into an elongated inclined surface that is inclined with respect to the first wall portion 21, for example, and spreads further outward with respect to the center of the accommodating member 20 in the longitudinal direction as the receiving portion 261 is further separated from the first wall portion 21. In this manner, the receiving portion 261 has a function of pushing and spreading the arm portions 53 in a direction in which the arm portions 53 are separated from each other, that is, outward when the accommodating member 20 is inserted between the two arm portions 53.

The arm portion locked portions 262 are provided at distal end parts of the receiving portions 261, that is, parts on the side opposite to the first wall portion 21. The arm portion locked portions 262 are formed into a groove shape that allows the arm portion locking portions 531 to be fitted therein, for example. Therefore, once the accommodating member 20 is pushed between the two arm portions 53 of the main body member 50 and reaches the predetermined position, the arm portion locking portions 531 folded back in a U shape are fitted into and locked by the groove-shaped arm portion locked portions 262. In this manner, the arm portion locking portions 531 lock the arm portion locked portions 262 and restrict movement of the accommodating member 20, and falling-off of the accommodating member 20 from between the arm portions 53 is thereby curbed.

The restricting portions 27 have a function of restricting movement of the arm portions 53 in the width direction of the receiving portions 261, that is, a function of curbing deviation of the arm portions 53 from the receiving portions 261. The restricting portions 27 are provided on both sides of the receiving portions 261 in the width direction, for example. The restricting portions 27 can be configured by elongated wall portions extending in the longitudinal direction of the receiving portions 261 and extending in a direction at a right angle with respect to the third wall portion 23 or the fourth wall portion 24, for example.

The assisting portion insertion holes 281 and 282 are provided to correspond to the two assisting portions 54. Here, in FIG. 6, the line virtually connecting the two receiving portions 261 and 261 coincides with the first virtual line L1 in FIG. 5, and the line virtually connecting the two assisting portion insertion holes 281 and 282 coincides with the second virtual line L2 in FIG. 5. Note that the first virtual line L1 and the second virtual line L2 are not illustrated in FIG. 6. In this case, each of the two receiving portions 261 and 261 and the two assisting portion insertion holes 281 and 282 is provided at the position where the first virtual line L1 and the second virtual line L2 intersect each other at the center of the surface of the first wall portion 21. In other words, the two assisting portion insertion holes 281 and 282 are provided at diagonal positions of the first wall portion 21 with the first virtual line L1 sandwiched therebetween. In this case, the first virtual line L1 and the second virtual line L2 intersect each other near the center of the first wall portion 21 in a plan view. In other words, the intersection Po of the first virtual line L1 and the second virtual line L2 is located near the center of the first wall portion 21. Moreover, the two receiving portions 261 and 261 and the two assisting portion insertion holes 281 and 282 are point-symmetrically disposed around the intersection Po of the first virtual line L1 and the second virtual line L2 in a plan view.

Here, in a case where the two assisting portion insertion holes 281 and 282 are to be distinguished, one of them will be referred to as a first assisting portion insertion hole 281, while the other will be referred to as a second assisting portion insertion hole 282. In the case of the present embodiment, one of the two assisting portion insertion holes 281 and 282, for example, the first assisting portion insertion hole 281 is configured such that the assisting portion locking portion 541 can lock around the first assisting portion insertion hole 281 as illustrated in FIG. 9. In this case, the first assisting portion insertion hole 281 is provided at a position separated from the inner side surface of the third wall portion 23. Also, in a case where the accommodating member 20 is about to move in the direction away from the fixation member 30, that is, downward in the paper plane in FIG. 9, the assisting portion locking portion 541 of the assisting portion 54 inserted into the first assisting portion insertion hole 281 locks in a region between the first assisting portion insertion hole 281 and the inner side surface of the third wall portion 23 in the inner side surface of the first wall portion 21.

Also, the other of the two assisting portion insertion holes 281 and 282, for example, the second assisting portion insertion hole 282 is configured such that the assisting portion locking portion 541 cannot lock around the second assisting portion insertion hole 282 as illustrated in FIG. 10. In this case, the second assisting portion insertion hole 282 is provided at a position where the outer shape of the second assisting portion insertion hole 282 is in contact with the inner side surface of the fourth wall portion 24. Therefore, the assisting portion locking portion 541 of the assisting portion 54 inserted into the second assisting portion insertion hole 282 does not lock on the inner side surface of the first wall portion 21.

As illustrated in FIGS. 3, 6, and 8, the guiding portion 29 is provided to correspond to at least one of the two assisting portion insertion holes 281 and 282. The guiding portion 29 can be provided to correspond to each of both the two assisting portion insertion holes 281 and 282, for example. In the case of the present embodiment, the guiding portion 29 is provided to correspond to the assisting portion insertion hole configured such that the assisting portion locking portion 541 can lock on the inner side surface of the first wall portion 21 out of the two assisting portion insertion holes 281 and 282, in this case, the first assisting portion insertion hole 281, for example.

The guiding portion 29 has a function of guiding the assisting portion 54 to the first assisting portion insertion hole 281 when the accommodating member 20 is attached to the main body member 50 of the fixation member 30. The guiding portion 29 can be formed into a shape projecting outward from the surface of the first wall portion 21 and having an inclined surface 291 that is inclined toward the side of the first assisting portion insertion hole 281, for example. When the accommodating member 20 is attached to the main body member 50 of the fixation member 30, the assisting portion 54 corresponding to the guiding portion 29 is guided to the first assisting portion insertion hole 281 along the inclined surface 291 of the guiding portion 29.

FIG. 11 is an example of a case where the motor protector 80 is attached to the encapsulated-type electric compressor 90 using the attachment device 10 with the above configuration. Note that in the following description, the encapsulated-type electric compressor 90 may be simply referred to as a compressor 90. The compressor 90 is an electric compressor for a refrigerant of a fully-encapsulated type or a semi-encapsulated type and can be used in an air conditioner, for example, to constitute a part of a refrigeration cycle. Also, the compressor 90 is not limited to a small to middle type with a relatively small capacity and may be of a large-capacity type.

The compressor 90 includes the compressor container 91, a compression mechanism 92, the motor 93, the motor protector 80, and the attachment device 10. The compressor container 91 is a container with air tightness and pressure resistance and constitutes an outer shell of the compressor 90. Both the compression mechanism 92 and the motor 93 are provided inside the compressor container 91. The compression mechanism 92 has a function of compressing and ejecting a refrigerant. It is possible to employ not only the compression mechanism 92 of a scroll type, for example, but also of a rotary vane type.

The motor 93 drives the compression mechanism 92. The motor 93 includes a winding, which is not illustrated. Also, a suction tube 94 and an ejection tube 95 are connected to the compressor container 91 in an air tight manner. The suction tube 94 is for guiding the refrigerant from a heat exchanger or the like, which is not illustrated, to the compression mechanism 92 inside the compressor container 91. The ejection tube 95 is for ejecting the refrigerant compressed by the compression mechanism 92 and sending the refrigerant to the heat exchanger, which is not illustrated.

It is possible to attach the motor protector 80 at a position that is as far as possible from the compression mechanism 92 and the motor 93 using the attachment device 10 according to the present embodiment. In the case of the present embodiment, the compressor container 91 includes a container main body 911 and a lid body 912. Also, a tightly closed container is configured by covering the container main body 911 with the lid body 912 and welding the periphery of the lid body 912. In this case, it is possible to attach the motor protector 80 to the inner surface of the lid body 912 using the attachment device 10 according to the present embodiment. It is thus possible to minimize an influence of heat generated when the container main body 911 and the lid body 912 are welded on the motor protector 80.

As described above, the attachment device 10 according to the present embodiment is an attachment device for attaching the heat response-type motor protector 80 for protecting the motor 93 incorporated in the encapsulated-type electric compressor 90 to the compressor container 91 of the encapsulated-type electric compressor 90. The attachment device 10 includes the accommodating member 20 and the fixation member 30. The accommodating member 20 is configured of a material with an electrical insulating property and is configured to be able to accommodate the motor protector 80 in a state where a part of the periphery of the motor protector 80 is opened. The fixation member 30 is configured to be fixed to the inner surface of the compressor container 91 and be able to fix the accommodating member 20 to the inner surface of the compressor container 91 with the accommodating member 20 accommodating the motor protector 80 detachably attached to the fixation member 30.

Also, the fixation member 30 includes the base portion 51 and the at least two arm portions 53. The base portion 51 is formed into a plate shape facing the inner surface of the compressor container 91. The two arm portions 53 are provided at positions sandwiching the accommodating member 20 on both outer sides thereof and extend from the base portion 51 to the side of the accommodating member 20. Once the accommodating member 20 is pushed into the two arm portions 53, at least one of the two arm portions 53 is elastically opened in a direction away from the other, and the two arm portions 53 receive the accommodating member 20. If the accommodating member 20 is pushed to the predetermined position, then the two arm portions 53 sandwich and hold the accommodating member 20 between the two arm portions 53 with a restoring force of the elastically opened arm portion 53.

In this manner, according to the present embodiment, the accommodating member 20 is configured to be able to accommodate the motor protector 80 in a state where a part of the periphery of the motor protector 80 is opened. Therefore, it is possible to improve efficiency in cooling the motor protector 80 and to curb a temperature rise of the motor protector 80 due to heat generated by an ordinary operation current as compared with an attachment method in the related art in which a motor protector is covered with a sleeve made of an insulating resin and tying it to a motor winding. In this manner, it is not necessary to set the operation temperature of the heat response plate of the motor protector 80 to be higher than the upper limit temperature of the motor, and as a result, it is possible to improve responsiveness to an abnormal current at the time of a low-temperature start.

Also, according to the present embodiment, the fixation member 30 is fixed to the inner surface of the compressor container 91. Moreover, the accommodating member 20 accommodating the motor protector 80 is attached to the inner surface of the compressor container 91 via the fixation member 30 by being pushed between the two arm portions 53 of the fixation member 30. Therefore, it is possible to improve workability as compared with the attachment method in the related art in which a motor protector is covered with a sleeve made of an insulating resin and tying it to a motor winding.

Furthermore, the fixation member 30 according to the present embodiment further includes the assisting portions 54. The assisting portions 54 extend from the base portion 51 to the side of the accommodating member 20, are caused to pass through the assisting portion insertion holes 281 and 282 provided in the accommodating member 20, stick out inside the accommodating member 20 and at positions where the assisting portions 54 sandwich the accommodating member 20 with the arm portions 53 in a case where the accommodating member 20 is attached to the fixation member 30, and cause an elastic force to act on the accommodating member 20 to restrict movement of the accommodating member 20 in a case where the accommodating member 20 moves in a direction that is parallel to the base portion 51.

According to this, even in a case where the accommodating member 20 accommodating the motor protector 80 is about to move, for example, due to an influence of vibration or the like caused by driving of the compressor 90, the movement thereof is restricted by the assisting portion 54. Therefore, it is possible to make the vibration or the like less affecting even in a case where the motor protector 80 is relatively large and heavy, and as a result, it is possible to curb a disadvantage such as falling-off of the accommodating member 20 accommodating the motor protector 80 from the fixation member 30.

The assisting portions 54 do not cause an elastic force to act on the accommodating member 20 in a case where the accommodating member 20 is in a stationary state. In other words, in a case where the compressor 90 is not driven and the accommodating member 20 does not vibrate, the assisting portions 54 are not in contact with the accommodating member 20. According to this, the assisting portions 54 coming into contact with the accommodating member 20 and sandwiching the accommodating member 20 between the assisting portions 54 themselves and the arm portions 53 even in a case where the compressor 90 is not driven and the accommodating member 20 does not vibration is curbed. Therefore, it is possible to improve workability by facilitating detachment of the accommodating member 20 when the accommodating member 20 is detached from the fixation member 30 along with the motor protector 80.

The assisting portions 54 further include assisting portion locking portions 541. The assisting portion locking portions 541 are provided at distal end parts of the assisting portions 54. Each assisting portion locking portion 541 can restrict movement of the accommodating member 20 in a direction away from the fixation member 30 by locking around the first assisting portion insertion hole 281 in a state where the assisting portion 54 is caused to pass through the first assisting portion insertion hole 281, for example. According to this, it is possible to more reliably hold the motor protector 80 even if the motor protector 80 is relatively large and heavy, and as a result, it is possible to further effectively curb falling-off from the fixation member 30 due to vibration or the like.

The assisting portion locking portions 541 are formed by folding back the distal end parts of the assisting portions 54 toward the outer side. According to this, it is possible to form the assisting portion locking portions 541 with a simple structure and to thereby improve producibility of the attachment device 10.

The fixation member 30 includes the two assisting portions 54 and 54. As illustrated in FIG. 5, the two arm portions 53 and 53 and the two assisting portions 54 and 54 are provided at positions where the first virtual line L1 virtually connecting the two arm portions 53 and 53 and the second virtual line L2 virtually connecting the two assisting portions 54 and 54 intersect near substantially the center in the plane of the base portion 51 in a plan view. According to this, it is possible to restrict movement of the accommodating member 20 in a rotation direction in a plan view with a satisfactory balance of the accommodating member 20 with the two arm portions 53 and 53 and the two assisting portions 54 and 54 and to thereby further effectively reduce influences of vibration that the accommodating member 20 receives.

Also, the two arm portions 53 and 53 and the two assisting portions 54 and 54 are point-symmetrically disposed around the intersection Po of the first virtual line L1 and the second virtual line L2 in a plan view. In other words, it is possible to attach the accommodating member 20 to the fixation member 30 even in a case where the fixation member 30 is rotated by 180 degrees in a plan view from the state in FIG. 5 and is fixed to the inner surface of the compressor container 91 in the present embodiment. Therefore, it is not necessary for an operator to pay attention to the orientation of the fixation member 30 when the fixation member 30 is fixed to the inner surface of the compressor container 91, and as a result, it is possible to improve workability. In other words, according to the present embodiment, it is possible to curb a disadvantage of a mistake in regard to the attachment orientation of the fixation member 30 with respect to the inner surface of the compressor container 91.

The accommodating member 20 further includes the two assisting portion insertion holes 281 and 282. The two assisting portion insertion holes 281 and 282 are provided to correspond to the assisting portions 54 and 54, respectively, and are configured such that the assisting portions 54 and 54 can be inserted. Also, one of the two assisting portion insertion holes 281 and 282, in this case, the first assisting portion insertion hole 281 is configured such that the assisting portion locking portion 541 can lock around the first assisting portion insertion hole 281 as illustrated in FIG. 9. Also, the other of the two assisting portion insertion holes 281 and 282, in this case, the second assisting portion insertion hole 282 is configured such that the assisting portion locking portion 541 cannot lock around the second assisting portion insertion hole 282 as illustrated in FIG. 10.

According to this, in a case where the compressor 90 is used with the accommodating member 20 attached to the fixation member 30, for example, the assisting portion locking portion 541 of the assisting portion 54 inserted into the first assisting portion insertion hole 281 locks around the first assisting portion insertion hole 281, and it is thus possible to effectively curb falling-off of the accommodating member 20 from the fixation member 30. On the other hand, the assisting portion locking portion 541 of the assisting portion 54 inserted into the second assisting portion insertion hole 282 does not lock around the second assisting portion insertion hole 282. Therefore, in a case where it is desired to detach the accommodating member 20 from the fixation member 30, it is only necessary to release the locking of the assisting portion locking portion 541 of one of the two assisting portions 54 and 54 inserted into the first assisting portion insertion hole 281 in addition to the arm portion locking portions 531 of the two arm portions 53. In other words, since it is not necessary to release the locking of the assisting portion locking portion 541 of the assisting portion 54 inserted into the second assisting portion insertion hole 282, it is possible to easily achieve the detachment. As described above, according to the present embodiment, it is possible to effectively curb falling-off of the accommodating member 20 from the fixation member 30 and to easily detach the accommodating member 20 in a case where it is desired to detach the accommodating member 20 from the fixation member 30.

The accommodating member 20 further includes the guiding portion 29. The guiding portion 29 is provided to correspond to at least one of the two assisting portion insertion holes 281 and 282. In the case of the present embodiment, the guiding portion 29 is provided to correspond to the first assisting portion insertion hole 281 which is configured such that the assisting portion locking portion 541 can lock around the assisting portion insertion hole 281, for example. Moreover, the guiding portion 29 has a function of guiding the assisting portion 54 to the first assisting portion insertion hole 281 when the accommodating member 20 is attached to the fixation member 30.

According to this, it is possible to smoothly insert the assisting portion 54 into the first assisting portion insertion hole 281 provided with the guiding portion 29, for example. Therefore, it is possible to further improve workability when the accommodating member 20 is attached to the fixation member 30.

The embodiment described above has been presented as an example and is not intended to limit the scope of the invention. This novel embodiment can be implemented in other various modes, and various omissions, replacement, changes can be made without departing from the gist of the invention. The present embodiment and modifications thereof are included in the scope and the gist of the invention and are included in the inventions described in the claims and the scope equivalent thereto.

The invention claimed is:

1. An attachment device for attaching a heat response-type motor protector for protecting a motor incorporated in an encapsulated-type electric compressor to a compressor container of the encapsulated-type electric compressor, the attachment device comprising:
   an accommodating member that is configured of a material with an electrical insulating property and is able to accommodate the motor protector in a state where a part of a periphery of the motor protector is opened; and
   a fixation member that is fixed to an inner surface of the compressor container and is able to fix the accommodating member to the inner surface of the compressor container with the accommodating member accommodating the motor protector detachably attached to the fixation member, wherein
   the fixation member includes
      a base portion that is formed into a plate shape facing the inner surface of the compressor container, and
      at least two arm portions that are provided at positions where the arm portions sandwich the accommodating member on both outer sides, and extend from the base portion to a side of the accommodating member,
   the two arm portions are configured such that once the accommodating member is pushed to inside of the two arm portions, at least one of the two arm portions is elastically opened in a direction away from the other to receive the accommodating member, and once the accommodating member is pushed to a predetermined position, the two arm portions are able to sandwich and hold the accommodating member between the two arm portions with a restoring force of the elastically opened arm portion, and
   the fixation member further includes assisting portions that extend from the base portion to the side of the accommodating member, are caused to pass through assisting portion insertion holes provided in the accommodating member and stick out inside the accommodating member and at positions where the assisting portions sandwich the accommodating member with the arm portions in a case where the accommodating member is attached to the fixation member, and cause an elastic force to act on the accommodating member to restrict movement of the accommodating member in a case where the accommodating member moves in a direction that is parallel to the base portion.

2. The device for attaching a motor protector according to claim 1, wherein the assisting portions do not cause the elastic force to act on the accommodating member in a case where the accommodating member is in a stationary state.

3. The device for attaching a motor protector according to claim 1, wherein the assisting portions further include assisting portion locking portions that are provided at distal end parts of the assisting portions and are able to restrict movement of the accommodating member in a direction away from the fixation member by locking around the assisting portion insertion holes in a state where the assisting portions are caused to pass through the assisting portion insertion holes.

4. The device for attaching a motor protector according to claim 3, wherein the assisting portion locking portions are formed by folding back the distal end parts of the assisting portions toward an outer side.

5. The device for attaching a motor protector according to claim 3, wherein
the fixation member includes the two assisting portions, and
the two arm portions and the two assisting portions are provided at positions where a first virtual line virtually connecting the two arm portions and a second virtual line virtually connecting the two assisting portions intersect in a plane of the base portion in a plan view.

6. The device for attaching a motor protector according to claim 5, wherein the two arm portions and the two assisting portions are point-symmetrically disposed around an intersection of the first virtual line and the second virtual line in a plan view.

7. The device for attaching a motor protector according to claim 5, wherein
the accommodating member further includes the two assisting portion insertion holes that are provided to correspond to the two assisting portions and allow the assisting portions to be inserted, and
one of the two assisting portion insertion holes is configured such that the assisting portion locking portion is able to lock around the assisting portion insertion hole, while the other is configured such that the assisting portion locking portion is not able to lock around the assisting portion insertion hole.

8. The device for attaching a motor protector according to claim 7, wherein the accommodating member further includes a guiding portion that is provided to correspond to at least one of the two assisting portion insertion holes and guides the assisting portion into the assisting portion insertion hole when the accommodating member is attached to the fixation member.

9. An encapsulated-type electric compressor comprising:
a compressor container that has air tightness;
a compression mechanism that is provided inside the compressor container and compresses and ejects a refrigerant;
a motor that is provided inside the compressor container and drives the compression mechanism;
a motor protector that is provided inside the compressor container and is connected to a power line of the motor; and
the device for attaching a motor protector according to claim 1 that attaches the motor protector to an inner surface of the compressor container.

* * * * *